United States Patent Office 2,748,799
Patented June 5, 1956

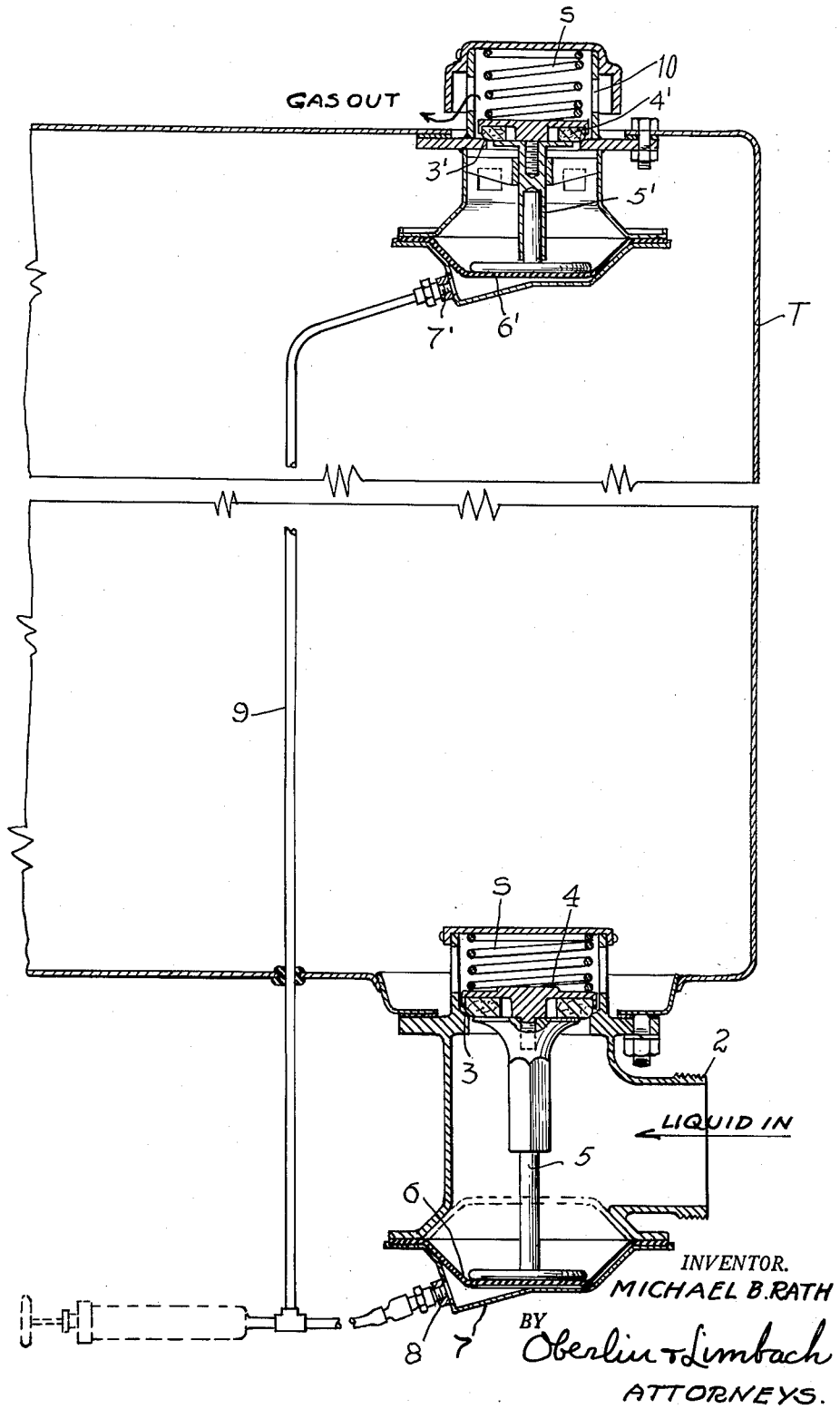

2,748,799

SIMULTANEOUSLY-OPERATED LIQUID AND GAS VENT VALVES

Michael B. Rath, Lorain, Ohio, assignor to The Standard Oil Company, Cleveland, Ohio, a corporation of Ohio Application November 15, 1952, Serial No. 320,691

4 Claims. (Cl. 137—587)

In tanks for liquids, and for instance notably in tank trucks, top loading has commonly been the rule. Bottom loading would be more desirable but has not been practicable, as it necessitates a valved liquid connection at the bottom and a valved gas vent at the top, and both valves require manual attention in filling and in discharging. An operator thus must climb to the top of the tank for the vent valve. It has been proposed to connect such valves by a rod for actuating both at the same time, but the idea has encountered the practical difficulty that distortions, wear, etc., operate against accurate operation, and thwart the desired functioning. Top loading also has required a man on top of the tank. This is undesirable, and many accidents have occurred. By the present invention, accuracy and effectiveness of functioning in liquid and vent valves in tanks of various orders is now made possible, and with simple operation controlled from a convenient location. And risk of accidents in men climbing up on the tank is eliminated. Other objects and advantages will become apparent from the following description.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

The sole figure is a broken, partly sectioned view of an embodiment of the invention.

The construction involves generally a liquid valve, such as at the bottom of a tank installation, and a vent valve at the top, and both valves are actuated by fluid pressure, such as pneumatic or hydraulic, as desired, and a smooth-working and effective control in common operates both valves.

In the drawing thus, for example, there is shown a tank T, and in its lower portion is a connection 2 through which the tank is charged or filled with any desired liquid. In the case of a tank truck, such connection may be adapted to receive a hose extension in screw-threaded connection engagement. The liquid valve comprises a valve housing, a valve seat 3 upon which the valve 4 closes, a stem 5, and a diaphragm 6, in a position under the valve stem. A coil spring $s$ between the valve 4 and the top of its housing holds the valve closed. Such diaphragm may be of corrugated metal or of rubber or synthetic composition, details of which are well known in the diaphragm valve art. The periphery of the diagram is clamped by holding-flanges in the housing, thereby providing a space between the diaphragm and the housing portion below. The space communicates by a duct 7 to a connection as at 8 for a source of supply of diaphragm-operating fluid pressure. Such source of pressure fluid may be for instance in the case of truck tanks the air-brake reservoir or usually a manually-operated pump connected on as by screw-thread connection at the point 8. For stationary tank installations, a pneumatic pressure or a hydraulic pressure source is applicable, as desired in any particular instance.

At the top of the tank there is a valve housing, with a valve seat 3' on which the valve 4' closes, and it is particularly noticed that while the valve at the bottom of the tank opens inwardly, the valve 4' at the top of the tank is on a different order and opens outwardly, in the direction of gas out-flow. The tank cannot build up disastrous pressure. Any pressure over what the spring $s$ is set for can open the valve as a safety measure. This valve thus is a valve for controlled venting, and additionally it is a combined safety valve otherwise. A coil spring $s$ between the valve and the top of the housing outside the tank serves normally to hold the valve seated; and the fluid pressure acting under the diaphragm opens the valve against the spring. In the vent valve there is a valve stem 5' and telescoping therewith a push-stem, and a diaphragm 6' with a duct 7' to the space between the diaphragm and the lower housing member as in the case of the liquid valve. A connection 9 joins between the ducts 7, 7' and the point of pressure fluid supply 8. With a hand-controlled valve in the supply line to 8 or with a manually operated air pump, fluid pressure may thus be applied as and when desired to the valves 4, 4', simultaneously, and liquid may be introduced or discharged through the valve 4 and at the same time air or gas is vented by the upper valve through the openings 10 to the atmosphere.

The operation of the device is understood from the foregoing, and for example in the case of a truck tank, by a manually-operated air pump connected at the point 8, the operator forces in a charge of air in compression to the connections for the diaphragms 6, 6' and thereby unseats both valves so that liquid can be supplied through the connection 2 and gas or air be vented through the top openings 10. On release of the air pressure by a diversion valve at the pump or by removal of the air-pump, the valves are reseated.

Various liquids, as common in tank usage and in tank truck operations can thus be conveniently handled, and it is not necessary for an operator to climb to the top of a tank to take care of venting or equalization in filling or discharging liquids. And absence of mechanical connections and sliding parts provides accurate and long-lasting service.

Other modes of applying the principle of the invention may be employed, change being made as regards the details described, provided the features stated in any of the following claims, or the equivalent of such, be employed.

I therefore particularly point out and distinctly claim as my invention:

1. In a tank, the combination of a valve housing and connection for liquid at the bottom, an inwardly unseating valve with dependent valve stem in said housing, a diaphragm under the valve stem, an opening for pressure fluid to the space between the diaphragm and said valve housing, a valve housing and vent for gas at the top of the tank, an outwardly unseating combined vent valve and safety valve with dependent stem in said valve housing, a diaphragm on which the lower end of the combined valve stem normally rests, such combined valve being movable outwardly independently of the diaphragm in response to excessive pressure within the tank, an opening for pressure fluid to the space between the diaphragm and the top valve housing, and a connection from a source of pressure fluid to the pressure fluid opening of the valve housing of said bottom valve and to the pressure fluid opening of the valve housing of said combined valve.

2. In a tank, the combination of a valve and valve housing and connection for liquid at the bottom, said valve unseating inwardly, a stem extending from the valve in said housing, a diaphragm under the valve in said valve housing, a valve housing and vent for gas at the top of the tank, and an outwardly unseating combined vent valve and safety valve in association with said vent, a stem extending from such valve, a diaphragm under such combined valve stem, the combined valve being movable outwardly independently of its associated diaphragm in response to excessive pressure within the tank, a pressure fluid opening to the space between each diaphragm and housing, and a connection from a source of pressure fluid to both pressure fluid openings.

3. In a tank, the combination of a connection and an inwardly unseating valve for liquid at the bottom, a stem extending from said valve, a diaphragm under said stem, an outwardly unseating combined vent valve and safety valve for gas at the top of the tank, a stem extending from such combined valve, a diaphragm on which the lower end of the combined valve stem normally rests, the combined valve being movable outwardly independently of its diaphragm in response to excessive pressure within the tank, and a connection for applying pressure fluid to the diaphragms of both valves.

4. In a tank, an inwardly unseating valve for liquid at the bottom of the tank, an outwardly unseating vent valve at the top of the tank, an actuator for each such valve responsive to fluid under pressure, operating means for applying pressure fluid to both such actuators thereby simultaneously to actuate the two valves, and a lost-motion connection between the vent valve and the actuator associated therewith, whereby such valve is openable independently of said operating means, the vent valve thereby serving additionally as a safety device responsive to excessive pressure within the tank proper.

References Cited in the file of this patent
UNITED STATES PATENTS

| | | |
|---|---|---|
| 509,992 | Wood | Dec. 5, 1893 |
| 984,151 | Okey | Feb. 14, 1911 |
| 1,524,054 | Penfield | Jan. 27, 1925 |
| 1,591,726 | Neuls | July 6, 1926 |
| 2,057,834 | Jars | Oct. 20, 1936 |
| 2,409,071 | Scott | Oct. 8, 1946 |
| 2,600,977 | De Frees | June 17, 1952 |
| 2,644,485 | Schwendner | July 7, 1953 |

FOREIGN PATENTS

| | | |
|---|---|---|
| 305,111 | Great Britain | Jan. 28, 1929 |